US007651760B2

(12) United States Patent
Gleason et al.

(10) Patent No.: US 7,651,760 B2
(45) Date of Patent: Jan. 26, 2010

(54) SUPERHYDROPHOBIC FIBERS PRODUCED BY ELECTROSPINNING AND CHEMICAL VAPOR DEPOSITION

(75) Inventors: Karen K. Gleason, Lexington, MA (US); Gregory C. Rutledge, Newton, MA (US); Malancha Gupta, Cambridge, MA (US); Minglin Ma, Cambridge, MA (US); Yu Mao, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/229,062

(22) Filed: Sep. 16, 2005

(65) Prior Publication Data

US 2007/0237947 A1 Oct. 11, 2007

(51) Int. Cl.
*B32B 27/12* (2006.01)

(52) U.S. Cl. .................... 428/292.1; 428/375; 428/394; 442/79; 442/80; 442/86; 442/88

(58) Field of Classification Search ....................... None
See application file for complete search history.

(56) References Cited

U.S. PATENT DOCUMENTS

| | | | | |
|---|---|---|---|---|
| 2,642,416 | A * | 6/1953 | Ahlbrecht et al. | 526/245 |
| 4,582,882 | A * | 4/1986 | Lynn et al. | 526/243 |
| 4,742,140 | A * | 5/1988 | Greenwood et al. | 526/245 |
| 4,791,167 | A * | 12/1988 | Saukaitis | 524/544 |
| 4,980,435 | A * | 12/1990 | Le | 526/245 |
| 5,055,538 | A * | 10/1991 | Amimoto et al. | 526/245 |
| 5,156,780 | A * | 10/1992 | Kenigsberg et al. | 264/424 |
| 5,296,282 | A * | 3/1994 | Evers | 428/195.1 |
| 5,310,824 | A * | 5/1994 | Burch et al. | 525/420 |
| 5,324,763 | A * | 6/1994 | Rossler et al. | 524/368 |
| 5,601,910 | A * | 2/1997 | Murphy et al. | 442/79 |
| 5,763,040 | A * | 6/1998 | Murphy et al. | 428/96 |
| 5,763,334 | A * | 6/1998 | Gupta et al. | 442/360 |
| 6,177,191 | B1 * | 1/2001 | Gupta et al. | 428/364 |
| 6,358,569 | B1 * | 3/2002 | Badyal et al. | 427/490 |

(Continued)

FOREIGN PATENT DOCUMENTS

WO WO 02076576 A2 * 10/2002

(Continued)

OTHER PUBLICATIONS

Ma, M. et al., "Electrospun Poly(Styrene-*block*-dimethylsiloxane) Block Copolymer Fibers Exhbiting Superhydrophobicity", *Langmuir*, 21:5549-5554 (American Chemical Society, 2005).

*Primary Examiner*—Jill Gray
(74) *Attorney, Agent, or Firm*—Dana M. Gordon; Foley Hoag LLP

(57) ABSTRACT

Disclosed is a versatile method to produce superhydrophobic surfaces by combining electrospinning and initiated chemical vapor deposition (iCVD). A wide variety of surfaces, including electrospun polyester fibers, may be coated by the inventive method. In one embodiment, poly(caprolactone) (PCL) was electrospun and then coated by iCVD with a thin layer of hydrophobic polymerized perfluoroalkyl ethyl methacrylate (PPFEMA). In certain embodiments said coated surfaces exhibit water contact angles of above 150 degrees, oleophobicities of at least Grade-8 and sliding angles of less than 12 degrees (for a water droplet of about 20 mg).

11 Claims, 8 Drawing Sheets

(a) Sample F1 (b) Sample F4 (c) Sample F6

(d) Sample B1 (e) Sample B3 (f) Sample B5

U.S. PATENT DOCUMENTS 7,105,270 B2 * 9/2006 Fujita et al. .............. 430/270.1
7,196,043 B2 * 3/2007 Valpey et al. ............... 510/204
2002/0114954 A1 * 8/2002 Badyal et al. ............... 428/422
2004/0127393 A1 * 7/2004 Valpey et al. ............... 510/511
2006/0081525 A1 * 4/2006 Lobovsky et al. ...... 210/321.88
2006/0292369 A1 * 12/2006 Rutledge et al. ............ 428/364

FOREIGN PATENT DOCUMENTS

WO WO 2006099107 A2 * 9/2006

* cited by examiner

[A] Initiation

[B] Propagation

[C] Termination

*and*

*or*

(a) Sample F1 (b) Sample F4 (c) Sample F6

(d) Sample B1 (e) Sample B3 (f) Sample B5

[A] [B]

[C] [D]

(a) (b) (c)

SUPERHYDROPHOBIC FIBERS PRODUCED BY ELECTROSPINNING AND CHEMICAL VAPOR DEPOSITION

GOVERNMENT SUPPORT

This invention was made with support provided by the Army Research Office (Grant No. DAAD-19-02-D-0002); therefore, the government has certain rights in the invention.

BACKGROUND OF THE INVENTION

Superhydrophobic surfaces (i.e., surfaces with water contact angles higher than 150°) have drawn great scientific and industrial interest due to their applications involving water repellency and self-cleaning and their anti-fouling properties. Feng, L.; Li, S.; Li, Y.; Li, H.; Zhang, L.; Zhai, J.; Song, Y.; Liu, B.; Jiang, L.; Zhu, D. *Adv. Mater.* 2002, 14, 1857; Quéré, D. *Nature Mater.* 2002, 1, 14; Lafuma, A.; Quéré, D. *Nature Mater.* 2003, 2, 457; Blossey, R. *Nature Mater.* 2003, 2, 301; and Erbil, H. Y.; Demirel, A. L.; Avcl, Y.; Mert, O. *Science* 2003, 299, 1377. Generally, both surface chemistry and surface roughness affect hydrophobicity. Nakajima, A.; Hashimoto, K.; Watanabe, T. *Monatsh. Chem.* 2001, 132, 31; and Quéré, D. *Physica A* 2002, 313, 32. For a flat solid surface, the contact angle (θ) can be described by Young's Equation: $\cos\theta=(\gamma_{SV}-\gamma_{SL})/\gamma_{LV}$, where $\gamma_{ij}$ is the surface tension of the solid-vapor, solid-liquid and liquid-vapor interfaces, respectively. Young, T. *Philos. Trans. R. Soc. London* 1805, 95, 65. However, due to the limitations of interfacial tension, surface chemistry alone is insufficient to achieve superhydrophobicity. A superhydrophobic surface requires in addition a certain surface roughness. Wenzel, R. N. *Ind. Eng. Chem.* 1936, 28, 988; Wenzel, R. N. *J. Phys. Colloid Chem.* 1949, 53, 1466; Cassie, A. B. D.; Baxter, S. *Trans. Faraday Soc.* 1944, 40, 546; Johnson, R. E.; Dettre, R. H. *Adv. Chem. Ser.* 1964, 43, 112; and Johnson, R. E.; Dettre, R. H. *Adv. Chem. Ser.* 1964, 43, 136. In the Wenzel hydrophobic state, the water droplet penetrates into the surface cavities and remains pinned to the surface, which magnifies the wetting property of the surface and leads to a high hysteresis (the difference between the advancing and the receding contact angles) or a high threshold sliding angle. In this state, the surface roughness (r), defined as the ratio of the actual contact area to the apparent surface area, is used to relate the apparent contact angle ($\theta^*$) and θ, as $\cos\theta^*=r\cos\theta$. In the Cassie-Baxter state, the liquid does not follow the surface contours, but bridges across the surface protrusions and sits upon a composite surface composed of both solid and air patches; in this case, the apparent liquid contact angle is described by $\cos\theta^*=\phi_s\cos\theta-\phi_v$, where $\phi_s$ and $\phi_v$ are the solid-liquid and gas-liquid contact area per unit projected surface area, respectively. The Cassie-Baxter state also has a low hysteresis and threshold sliding angle because the water can slide or roll easily when it sits partly on air; therefore, in real applications, the stable Cassie-Baxter state is generally more desirable for applications where water needs to be shed. Based on these principles, numerous methods have been reported to produce superhydrophobic surfaces by either increasing the surface roughness of an inherently hydrophobic material or decreasing the surface free energy of a rough surface by post treatment. Onda, T.; Shibuichi, S.; Satoh, N.; Tsujii, K. *Langmuir* 1996, 12, 2125; Feng, L.; Li, S.; Li, H.; Zhai, J.; Song, Y; Jiang, L.; Zhu, D. *Angew. Chem. Int. Ed.* 2002, 41, 1221; Quéré, D.; Lafuma, A.; Bico, J. *Nanotechnology* 2003, 14, 1109; Yoshimitsu, Z.; Nakajima, A.; Watanabe, T.; Hashimoto, K. *Langmuir* 2002, 18, 5818; Lau, K. K. S.; Bico, J.; Teo, K. B. K.; Chhowalla, M.; Amaratunga, G. A. J.; Milne, W. I.; McKinley, G. H.; Gleason, K. K. *Nano Lett.* 2003, 3, 1701; Woodward, I.; Schofield, W. C. E.; Roucoules, V.; Badyal, J. P. S. *Langmuir* 2003, 19, 3432; and Zhai, L.; Cebeci, F. C.; Cohen, R. E.; Rubner, M. F. *Nano Lett.* 2004, 4, 1349.

Electrospinning is a simple but versatile method to produce continuous, submicron diameter fibers. It has recently been shown to provide the appropriate surface roughness to make superhydrophobic surfaces. Jiang, L.; Zhao, Y.; Zhai, J. *Angew. Chem. Int. Ed.* 2004, 43, 4338; Acatay, K.; Simsek, E.; Ow-Yang, C.; Menceloglu, Y. Z. *Angew. Chem. Int. Ed.* 2004, 43, 5210; and Ma, M.; Hill, R. M.; Lowery, J. L.; Fridrikh, S. V.; Rutledge, G. C. *Langmuir,* 2005, 21, 5549. Both experimental and theoretical studies have been conducted to characterize the process and control the fiber morphology. Fong, H.; Chun, I.; Reneker, D. H. *Polymer* 1999, 40, 4585; Reneker, D. H.; Yarin, A. L.; Fong, H.; Koombhongse, S. *J. Appl. Phys.* 2000, 87, 4531; Shin, Y. M.; Hohman, M. M.; Brenner, M. P.; Rutledge, G. C. *Polymer* 2001, 42, 9955; Shin, Y. M.; Hohman, M. M.; Brenner, M. P.; Rutledge, G. C. *Appl. Phys. Lett.* 2001, 78, 1149; Theron, S. A.; Zussman, E.; Yarin, A. L. *Polymer* 2004, 45, 2017; Yarin, A. L.; Koombhongse, S.; Reneker, D. H. *J. Appl. Phys.* 2001, 89, 3018; Yarin, A. L.; Koombhongse, S.; Reneker, D. H. *J. Appl. Phys.* 2001, 90, 4836; Hohman, M. M.; Shin, Y. M.; Rutledge, G. C.; Brenner, M. P. *Phys. Fluids* 2001, 13, 2201; Hohman, M. M.; Shin, Y. M.; Rutledge, G. C.; Brenner, M. P. *Phys. Fluids* 2001, 13, 2221; Feng, J. J. *Phys. Fluids* 2002, 14, 3912; and Fridrikh, S. V.; Yu, J. H.; Brenner, M. P.; Rutledge, G. C. *Phys. Rev. Lett.* 2003, 90, 144502. These studies clearly show that the formation of ultrathin fibers is achieved by the stretching of the polymer jet associated with the onset of a whipping instability caused by the electrostatic forces. The polymeric fluid must have adequate viscoelasticity (usually controlled by an appropriate combination of molecular weight and concentration of the polymer in solution) and conductivity in order to be electrospun, i.e., to form uniform fibers. Otherwise, the surface tension, which tends to break the liquid jet into droplets (the effect known as Rayleigh instability), dominates the process, and beaded fibers or polymeric microdroplets will be formed instead of uniform fibers. The diversity of electrospun materials and the interesting properties of electrospun fibers have led to applications ranging from composite materials, sensing technology, and filtration to tissue engineering and biomedical applications. Frenot, A.; Chronakis, I. S.; *Curr. Opin. Colloid Interface Sci.* 2003, 8, 64; Huang, Z.-M.; Zhang, Y.-Z.; Kotaki, M.; Ramakrishna, S. *Compos. Sci. Technol.* 2003, 63, 2223; Li, D.; Xia, Y. *Adv. Mater.* 2004, 16, 1151; Dzenis, Y. *Science* 2004, 304, 1917; and Thandavamoorthy Subbiah; Bhat, G. S.; Tock, R. W.; Parameswaran, S.; Ramkumar, S. S. *J. Appl. Polym. Sci.* 2005, 96, 557.

Initiated chemical vapor deposition (iCVD) is a one-step, solvent-free deposition technique. The conformal nature of the iCVD process enables coating on complex substrates. It allows films of nanoscale thicknesses to be produced and has been used to coat nanoscale features. Lau, K. K. S.; Bico, J.; Teo, K. B. K.; Chhowalla, M.; Amaratunga, G. A. J.; Milne, W. I.; McKinley, G. H.; Gleason, K. K. *Nano Lett.* 2003, 3, 1701. Fluoropolymer coatings are well known for their low surface energies, with poly(tetrafluoroethylene) (PTFE, $(-CF_2-)_n$) having $\gamma_s$ of about 20 mN/m and fluorinated acrylic polymers exhibiting even lower values of $\gamma_s$ (about 5.6 to about 7.8 mN/m) due to their $CF_3$ terminated side chains and their comb-like structures. Thunemann, A. F.; Lieske, A.; Paulke, B. R. *Adv. Mater.* 1999, 11, 321; Anton, D. *Adv. Mater.* 1998, 10, 1197; and Tsibouklis, J.; Nevell, T. G. *Adv. Mater.* 2003, 15, 647. The iCVD technique has been successfully applied in polymerizing perfluoroalkyl ethyl methacrylate (PFEMA, $CH_2{=}C(CH_3)COOCH_2CH_2(CF_2)_nCF_3$, n~7, Zonyl®) using tert-butyl peroxide as an initiator (results not shown). The dispersive surface energy of the resulting poly (PFEMA) (PPFEMA) coating is 9.3 mN/m. The process involves thermal decomposition of the initiator molecule into free radical species and subsequent addition reaction of the monomer, as shown in FIG. 1.

SUMMARY OF THE INVENTION

One aspect of the present invention relates to a versatile method to produce superhydrophobic fibers by combining electrospinning and initiated chemical vapor deposition (iCVD). In one embodiment, poly(caprolactone) (PCL) was electrospun and then coated by iCVD with a thin layer of hydrophobic polymerized perfluoroalkyl ethyl methacrylate (PPFEMA). The hierarchical surface roughness inherent in the PCL electrospun mats and the low surface free energy of the coating layer obtained by iCVD yields a fiber with stable superhydrophobicity, a contact angle of about 175° and a threshold sliding angle less than about 2.5° for a water droplet of about 20 mg. This PPFEMA-coated PCL mat was also shown to exhibit at least "Grade-8" oleophobicity. In certain embodiments, hydrophobicity was demonstrated to increase monotonically with a reduction in diameter among bead-free fibers, and with the introduction of a high density of relatively small diameter beads. In other embodiments superhydrophobicity was shown to be a function of fiber morphology in both beaded and bead-free fibers with diameters ranging from about 600 nm to about 2200 nm.

DETAILED DESCRIPTION OF THE INVENTION

Overview

Figure 1:
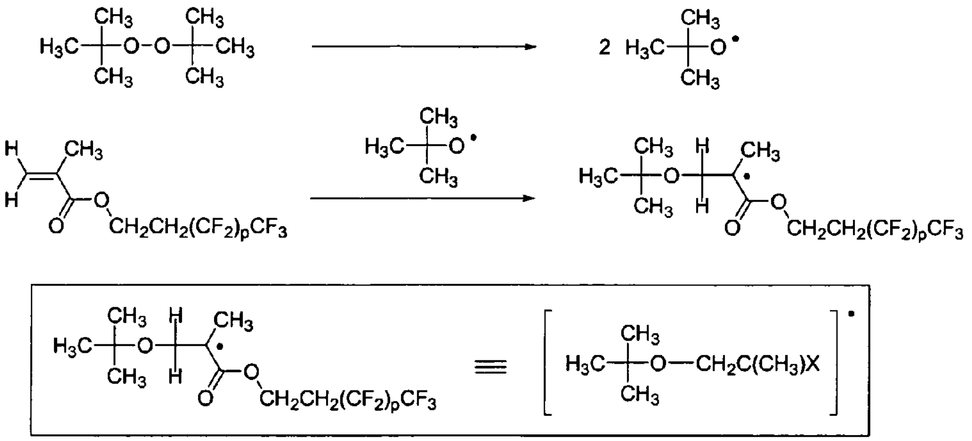
FIG. 1 depicts a proposed reaction mechanism for the polymerization of perfluoroalkyl ethyl methacrylate (PFEMA, $CH_2{=}C(CH_3)COOCH_2CH_2(CF_2)_pCF_3$, p is about 7, Zonyl®) using initiated chemical vapor (iCVD) deposition with tert-butyl peroxide as an initiator; m and n are integers.
Figure 1:
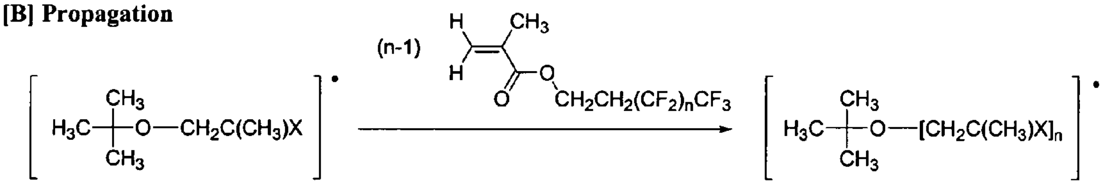
Figure 1:
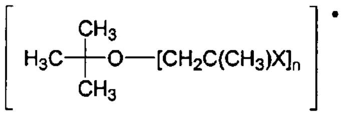
Figure 1:
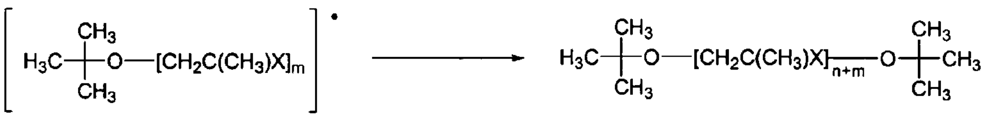
Figure 1:
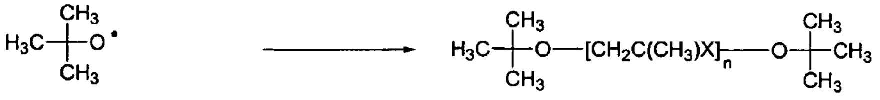

Herein a method to make highly superhydrophobic surfaces by combining electrospinning and iCVD is disclosed. The broad range of materials that can be electrospun, combined with the benign and conformal nature of the iCVD coating, make this method quite versatile.

Definitions

For convenience, certain terms employed in the specification, examples, and appended claims are collected here.

As used herein, "superhydrophobic surfaces" are surfaces with water contact angles greater than about 150°.

The term "contact angle" refers to the liquid side tangential line drawn through the three phase boundary where a liquid, gas and solid interact. In certain embodiments said liquid is water, n-decane, n-octane, or n-heptane.

The phrase "dynamic contact angle" may be divided into "advancing contact angle" and "receding contact angle" which refer to the contact angles measured when the three phase line is in controlled movement by wetting the solid by a liquid or by withdrawing the liquid over a pre-wetted solid, respectively. In certain embodiments said liquid is water, n-decane, n-octane, or n-heptane.

The phrase "contact angle hysteresis" refers to the difference between the measured advancing and receding contact angles.

The term "sliding angle" refers to the smallest angle one must tilt a surface until a liquid droplet of a specified size on said surface starts moving.

The term "wettability" refers to a process when a liquid spreads on (wets) a solid substrate. Wettability may be estimated by determining the contact angle of a droplet on a surface.

The term "surface" or "surfaces" can mean any surface of any material, including glass, plastics, metals, polymers, and like. It can include surfaces constructed out of more than one material, including coated surfaces. Non-limiting examples of surfaces include nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET). In certain embodiments, the surfaces of the instant invention are electrospun fibers and mats thereof.

The phrase "weight average molecular weight" refers to a particular measure of the molecular weight of a polymer. The weight average molecular weight is calculated as follows: determine the molecular weight of a number of polymer molecules; add the squares of these weights; and then divide by the total weight of the molecules.

The phrase "number average molecular weight" refers to a particular measure of the molecular weight of a polymer. The number average molecular weight is the common average of the molecular weights of the individual polymer molecules. It is determined by measuring the molecular weight of n polymer molecules, summing the weights, and dividing by n.

The phrase "polydispersity index" refers to the ratio of the "weight average molecular weight" to the "number average molecular weight" for a particular polymer; it reflects the distribution of individual molecular weights in a polymer sample.

The term "heteroatom" is art-recognized and refers to an atom of any element other than carbon or hydrogen. Illustrative heteroatoms include boron, nitrogen, oxygen, phosphorus, sulfur and selenium.

The term "alkyl" is art-recognized, and includes saturated aliphatic groups, including straight-chain alkyl groups, branched-chain alkyl groups, cycloalkyl(alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

Unless the number of carbons is otherwise specified, "lower alkyl" refers to an alkyl group, as defined above, but having from one to about ten carbons, alternatively from one to about six carbon atoms in its backbone structure. Likewise, "lower alkenyl" and "lower alkynyl" have similar chain lengths.

The term "aralkyl" is art-recognized and refers to an alkyl group substituted with an aryl group (e.g., an aromatic or heteroaromatic group).

The terms "alkenyl" and "alkynyl" are art-recognized and refer to unsaturated aliphatic groups analogous in length and possible substitution to the alkyls described above, but that contain at least one double or triple bond respectively.

The term "aryl" is art-recognized and refers to 5-, 6- and 7-membered single-ring aromatic groups that may include from zero to four heteroatoms, for example, benzene, naphthalene, anthracene, pyrene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms ortho, meta and para are art-recognized and refer to 1,2-, 1,3- and 1,4-disubstituted benzenes, respectively. For example, the names 1,2-dimethylbenzene and ortho-dimethylbenzene are synonymous.

The terms "heterocyclyl", "heteroaryl", or "heterocyclic group" are art-recognized and refer to 3- to about 10-membered ring structures, alternatively 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxanthene, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The terms "polycyclyl" or "polycyclic group" are art-recognized and refer to two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbocycle" is art-recognized and refers to an aromatic or non-aromatic ring in which each atom of the ring is carbon.

The term "nitro" is art-recognized and refers to —$NO_2$; the term "halogen" is art-recognized and refers to —F, —Cl, —Br or —I; the term "sulfhydryl" is art-recognized and refers to —SH; the term "hydroxyl" means —OH; and the term "sulfonyl" is art-ecognized and refers to —$SO_2^-$. "Halide" designates the corresponding anion of the halogens, and "pseudohalide" has the definition set forth on page 560 of "Advanced Inorganic Chemistry" by Cotton and Wilkinson.

The terms "amine" and "amino" are art-recognized and refer to both unsubstituted and substituted amines, e.g., a moiety that may be represented by the general formulas:

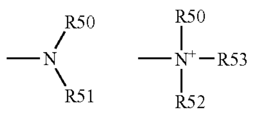

wherein R50, R51, R52 and R53 each independently represent a hydrogen, an alkyl, an alkenyl, —$(CH_2)_m$—R61, or R50 and R51 or R52, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In other embodiments, R50 and R51 (and optionally R52) each independently represent a hydrogen, an alkyl, an alkenyl, or —$(CH_2)_m$—R61. Thus, the term "alkylamine" includes an amine group, as defined above, having a substituted or unsubstituted alkyl attached thereto, i.e., at least one of R50 and R51 is an alkyl group.

The term "acylamino" is art-recognized and refers to a moiety that may be represented by the general formula:

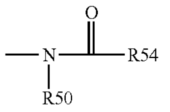

wherein R50 is as defined above, and R54 represents a hydrogen, an alkyl, an alkenyl or $-(CH_2)_m-$R61, where m and R61 are as defined above.

The term "amido" is art recognized as an amino-substituted carbonyl and includes a moiety that may be represented by the general formula:

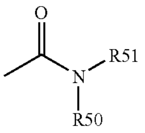

wherein R50 and R51 are as defined above. Certain embodiments of the amide in the present invention will not include imides which may be unstable.

The term "alkylthio" refers to an alkyl group, as defined above, having a sulfur radical attached thereto. In certain embodiments, the "alkylthio" moiety is represented by one of —S-alkyl, —S-alkenyl, —S-alkynyl, and $-S-(CH_2)_m-$R61, wherein m and R61 are defined above. Representative alkylthio groups include methylthio, ethyl thio, and the like.

The term "carboxyl" is art recognized and includes such moieties as may be represented by the general formulas:

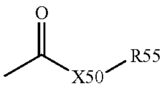 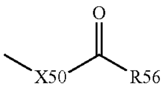

wherein X50 is a bond or represents an oxygen or a sulfur, and R55 and R56 represents a hydrogen, an alkyl, an alkenyl, $-(CH_2)_m-$R61or a pharmaceutically acceptable salt, R56 represents a hydrogen, an alkyl, an alkenyl or $-(CH_2)_m-$R61, where m and R61 are defined above. Where X50 is an oxygen and R55 or R56 is not hydrogen, the formula represents an "ester". Where X50 is an oxygen, and R55 is as defined above, the moiety is referred to herein as a carboxyl group, and particularly when R55 is a hydrogen, the formula represents a "carboxylic acid". Where X50 is an oxygen, and R56 is hydrogen, the formula represents a "formate". In general, where the oxygen atom of the above formula is replaced by sulfur, the formula represents a "thiolcarbonyl" group. Where X50 is a sulfur and R55 or R56 is not hydrogen, the formula represents a "thiolester." Where X50 is a sulfur and R55 is hydrogen, the formula represents a "thiolcarboxylic acid." Where X50 is a sulfur and R56 is hydrogen, the formula represents a "thiolformate." On the other hand, where X50 is a bond, and R55 is not hydrogen, the above formula represents a "ketone" group. Where X50 is a bond, and R55 is hydrogen, the above formula represents an "aldehyde" group.

The term "carbamoyl" refers to —O(C=O)NRR', where R and R' are independently H, aliphatic groups, aryl groups or heteroaryl groups.

The term "oxo" refers to a carbonyl oxygen (=O).

The terms "oxime" and "oxime ether" are art-recognized and refer to moieties that may be represented by the general formula:

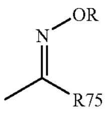

wherein R75 is hydrogen, alkyl, cycloalkyl, alkenyl, alkynyl, aryl, aralkyl, or $-(CH_2)_m-$R61. The moiety is an "oxime" when R is H; and it is an "oxime ether" when R is alkyl, cycloalkyl, alkenyl, alkynyl, aryl, aralkyl, or $-(CH_2)_m-$R61.

The terms "alkoxyl" or "alkoxy" are art-recognized and refer to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, $-O-(CH_2)_m-$R61, where m and R61 are described above.

The term "sulfonate" is art recognized and refers to a moiety that may be represented by the general formula:

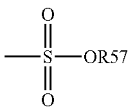

in which R57 is an electron pair, hydrogen, alkyl, cycloalkyl, or aryl.

The term "sulfate" is art recognized and includes a moiety that may be represented by the general formula:

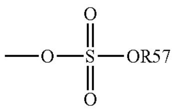

in which R57 is as defined above.

The term "sulfonamido" is art recognized and includes a moiety that may be represented by the general formula:

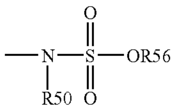

in which R50 and R56 are as defined above.

The term "sulfamoyl" is art-recognized and refers to a moiety that may be represented by the general formula:

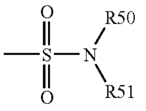

in which R50 and R51 are as defined above.

The term "sulfonyl" is art-recognized and refers to a moiety that may be represented by the general formula:

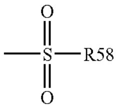

in which R58 is one of the following: hydrogen, alkyl, alkenyl, alkynyl, cycloalkyl, heterocyclyl, aryl or heteroaryl.

The term "sulfoxido" is art-recognized and refers to a moiety that may be represented by the general formula:

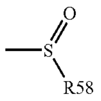

in which R58 is defined above.

The term "phosphoryl" is art-recognized and may in general be represented by the formula:

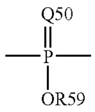

wherein Q50 represents S or O, and R59 represents hydrogen, a lower alkyl or an aryl. When used to substitute, e.g., an alkyl, the phosphoryl group of the phosphorylalkyl may be represented by the general formulas:

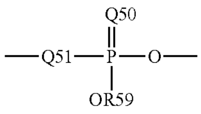
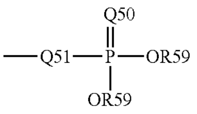

wherein Q50 and R59, each independently, are defined above, and Q51 represents O, S or N. When Q50 is S, the phosphoryl moiety is a "phosphorothioate".

The term "phosphoramidite" is art-recognized and may be represented in the general formulas:

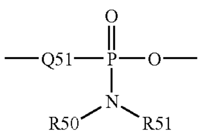
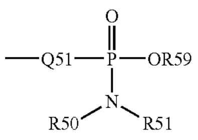

wherein Q51, R50, R51 and R59 are as defined above.

The term "phosphonamidite" is art-recognized and may be represented in the general formulas:

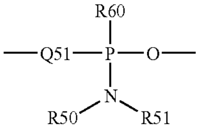
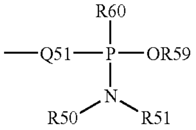

wherein Q51, R50, R51 and R59 are as defined above, and R60 represents a lower alkyl or an aryl.

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

The definition of each expression, e.g., alkyl, m, n, and the like, when it occurs more than once in any structure, is intended to be independent of its definition elsewhere in the same structure.

The term "selenoalkyl" is art-recognized and refers to an alkyl group having a substituted seleno group attached thereto. Exemplary "selenoethers" which may be substituted on the alkyl are selected from one of —Se-alkyl, —Se-alkenyl, —Se-alkynyl, and —Se—$(CH_2)_m$—R61, m and R61 being defined above.

The abbreviations Me, Et, Ph, Tf, Nf, Ts, and Ms represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; this list is typically presented in a table entitled Standard List of Abbreviations.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

As used herein "-alkyl" refers to a radical such as $—CH_2CH_3$, while "-alkyl-" refers to a diradical such as $—CH_2CH_2—$.

Also, the prefix "fluoro" indicates at least one hydrogen has been replaced with a fluorine. As used herein, "-fluoroalkyl", "-fluoroaryl" and "-fluorocycloalkyl," for example indicates an alkyl, aryl or cycloalkyl group, for example, with at least one fluorine substituent.

For purposes of this invention, the chemical elements are identified in accordance with the Periodic Table of the Elements, CAS version, "Handbook of Chemistry and Physics", 67th Ed., 1986-87, inside cover.

Selected Superhydrophobic Fibers of the Invention

One aspect of the present invention relates to a coated surface, comprising a surface and a polymer coating, wherein said polymer coating comprises a plurality of monomers represented by formula I:

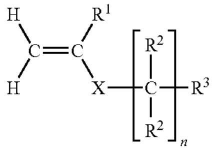

I wherein, independently for each occurrence,

R is -hydrogen, -halogen, -alkyl, -cycloalkyl, -heterocycloalkyl, -alkenyl, -cycloalkenyl, -heterocycloalkenyl, -alkynyl, -cyano, -aryl or -heteroaryl;

$R^1$ is hydrogen or alkyl;

$R^2$ is -hydrogen, -halogen, -alkyl, -cycloalkyl, -heterocycloalkyl, -alkenyl, -cycloalkenyl, -heterocycloalkenyl, -alkynyl, -aryl or -heteroaryl;

$R^3$ is -fluoroalkyl, -fluorocycloalkyl, -fluoroheterocycloalkyl, -fluoroalkenyl, -fluorocycloalkenyl, -fluoroheterocycloalkenyl, -fluoroalkynyl, -fluoroaryl or -fluoroheteroaryl;

X is absent, —O—, —N(R)—, —S—, —C(═O)O—, —C(═O)N(R)—, —C(═O)S—, —S(═O)—, —$S(═O)_2$—, —C(═O)—, —C(═NR)—, —C(═S)—, —C(R)═C(R)—, —C≡C—, -cycloalkyl-, -heterocycloalkyl-, -cycloalkenyl-, -heterocycloalkenyl-, -aryl- or -heteroaryl-; and n is 0 to 10 inclusive.

In certain embodiments, the present invention relates to the aforementioned coated surface, wherein $R^1$ is hydrogen or methyl.

In certain embodiments, the present invention relates to the aforementioned coated surface, wherein $R^1$ is hydrogen.

In certain embodiments, the present invention relates to the aforementioned coated surface, wherein $R^1$ is methyl.

In certain embodiments, the present invention relates to the aforementioned coated surface, wherein $R^2$ is hydrogen, halogen or alkyl.

In certain embodiments, the present invention relates to the aforementioned coated surface, wherein $R^2$ is hydrogen.

In certain embodiments, the present invention relates to the aforementioned coated surface, wherein $R^3$is fluoroalkyl, fluoroaryl or fluroaralkyl.

In certain embodiments, the present invention relates to the aforementioned coated surface, wherein $R^3$ is fluoroalkyl.

In certain embodiments, the present invention relates to the aforementioned coated surface, wherein X is —O—, —N(R)—, —C(═O)O—, —C(═O)N(R)—, —C(═O)—, -aryl- or -heteroaryl-.

In certain embodiments, the present invention relates to the aforementioned coated surface, wherein X is —C(═O)O—.

In certain embodiments, the present invention relates to the aforementioned coated surface, wherein n is 0-3 inclusive.

In certain embodiments, the present invention relates to the aforementioned coated surface, wherein n is 4-6 inclusive.

In certain embodiments, the present invention relates to the aforementioned coated surface, wherein n is 7-10 inclusive.

Another aspect of the present invention relates to a coated surface, comprising a surface and a polymer coating, wherein said polymer coating comprises a plurality of monomers represented by formula II:

II

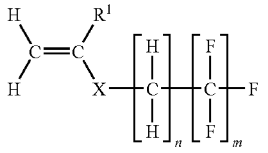

wherein, independently for each occurrence,

R is -hydrogen, -halogen, -alkyl, -cycloalkyl, -heterocycloalkyl, -alkenyl, -cycloalkenyl, -heterocycloalkenyl, -alkynyl, -cyano, -aryl or -heteroaryl;

$R^1$ is hydrogen or alkyl;

X is —O—, —N(R)—, —C(═O)O—, —C(═O)N(R)—, —C(═O)—, —C(═NR)—,

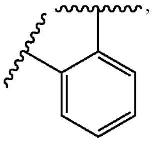,
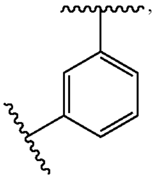,
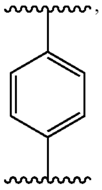,
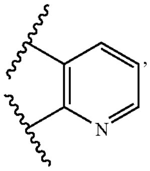,
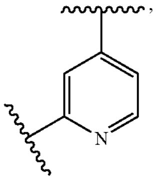,
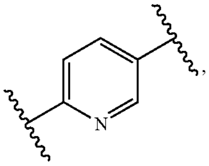,
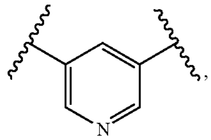, or
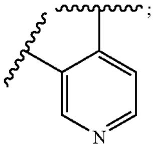;

n is 0 to 10 inclusive; and m is 5 to 15 inclusive.

In certain embodiments, the present invention relates to the aforementioned coated surface, wherein $R^1$ is hydrogen or methyl.

In certain embodiments, the present invention relates to the aforementioned coated surface, wherein $R^1$ is hydrogen.

In certain embodiments, the present invention relates to the aforementioned coated surface, wherein $R^1$ is methyl.

In certain embodiments, the present invention relates to the aforementioned coated surface, wherein X is —C(═O)O—, —C(═O)N(R)— or —C(═O)—.

In certain embodiments, the present invention relates to the aforementioned coated surface, wherein X is —C(═O)O—.

In certain embodiments, the present invention relates to the aforementioned coated surface, wherein n is 0-3 inclusive.

In certain embodiments, the present invention relates to the aforementioned coated surface, wherein n is 2.

In certain embodiments, the present invention relates to the aforementioned coated surface, wherein m is 6-9 inclusive.

In certain embodiments, the present invention relates to the aforementioned coated surface, wherein m is 7.

Another aspect of the present invention relates to a coated surface, comprising a surface and a polymer coating, wherein said polymer coating comprises a plurality of monomers represented by formula III:

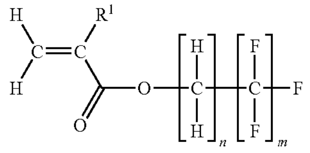

III wherein, independently for each occurrence, $R^1$ is hydrogen or methyl;

n is 0 to 5 inclusive; and m is 5 to 10 inclusive.

In certain embodiments, the present invention relates to the aforementioned coated surface, wherein $R^1$ is hydrogen or methyl.

In certain embodiments, the present invention relates to the aforementioned coated surface, wherein $R^1$ is hydrogen.

In certain embodiments, the present invention relates to the aforementioned coated surface, wherein $R^1$ is methyl.

In certain embodiments, the present invention relates to the aforementioned coated surface, wherein n is 2.

In certain embodiments, the present invention relates to the aforementioned coated surface, wherein m is 7.

In certain embodiments, the present invention relates to the aforementioned coated surface, wherein $R^1$ is methyl; n is 2; and m is 7.

Properties of the Inventive Coated Surfaces

In certain embodiments, the present invention relates to any of the aforementioned coated surface, wherein said coated surface exhibits a water contact angle of above 150 degrees. In one embodiment, the water contact angle is above about 155 degrees. In another embodiment, the water contact angle is between about 155 degrees and 160 degrees. In another embodiment, the water contact angle is above about 160 degrees. In another embodiment, the water contact angle is between about 160 degrees and 165 degrees. In another embodiment, the water contact angle is above about 165 degrees. In another embodiment, the water contact angle is between about 165 degrees and 170 degrees. In another embodiment, the water contact angle is above about 170 degrees. In another embodiment, the water contact angle is between about 170 degrees and 175 degrees. In another embodiment, the water contact angle is above about 175 degrees.

In certain embodiments, the present invention relates to the aforementioned coated surface, wherein said coated surface has a water sliding angle of less than or equal to about 12.5 degrees for a 20 mg water droplet. In one embodiment, the water sliding angle is about 2.5 degrees for a water droplet of about 20 mg. In another embodiment, the water sliding angle is less than or equal to about 2.5 degrees for a water droplet of about 20 mg. In another embodiment, the water sliding angle is less than about 5.0 degrees for a water droplet of about 20 mg. In another embodiment, the water sliding angle is greater than about 2.5 degrees and less than about 5.0 degrees for a water droplet of about 20 mg. In another embodiment, the water sliding angle is less than about 7.5 degrees for a water droplet of about 20 mg. In another embodiment, the water sliding angle is greater than about 5.0 degrees and less than about 7.5 degrees for a water droplet of about 20 mg. In another embodiment, the water sliding angle is less than about 10.0 degrees for a water droplet of about 20 mg. In another embodiment, the water sliding angle is greater than about 7.5 degrees and less than about 10.0 degrees for a water droplet of about 20 mg. In another embodiment, the water sliding angle is less than about 12.5 degrees for a water droplet of about 20 mg. In another embodiment, the water sliding angle is greater than about 10.0 degrees and less than about 12.5 degrees for a water droplet of about 20 mg. In another embodiment, the water sliding angle is less than about 15.0 degrees for a water droplet of about 20 mg. In another embodiment, the water sliding angle is greater than about 12.5 degrees and less than about 15.0 degrees for a water droplet of about 20 mg.

In certain embodiments, the present invention relates to the aforementioned coated surface, wherein said coated surface has a water contact angle hysteresis of less than about 15 degrees. In one embodiment of the invention, the water contact angle hysteresis is between about 10 degrees and about 15 degrees. In another embodiment, the water contact angle hysteresis is between about 8 degrees and about 13 degrees. In another embodiment, the water contact angle hysteresis is between about 6 degrees and about 11 degrees. In another embodiment, the water contact hysteresis is between about 0 degrees and 5 degrees.

In certain embodiments, the present invention relates to the aforementioned coated surface, wherein said polymer-coated surface has an oleophibicity of at least Grade-8. In one embodiment of the invention, the present invention relates to the aforementioned coated surface, wherein said polymer-coated surface has an oleophibicity of at least Grade-7. In another embodiment, the present invention relates to the aforementioned coated surface, wherein said polymer-coated surface has an oleophibicity of at least Grade-7. In another embodiment, the present invention relates to the aforementioned coated surface, wherein said polymer-coated surface has an oleophibicity of at least Grade-6. In another embodiment, the present invention relates to the aforementioned coated surface, wherein said polymer-coated surface has an oleophibicity of at least Grade-5. In another embodiment, the present invention relates to the aforementioned coated surface, wherein said polymer-coated surface has an oleophibicity of at least Grade-4. In another embodiment, the present invention relates to the aforementioned coated surface, wherein said polymer-coated surface has an oleophibicity of at least Grade-3. In another embodiment, the present invention relates to the aforementioned coated surface, wherein said polymer-coated surface has an oleophibicity of at least Grade-2. In another embodiment, the present invention relates to the aforementioned coated surface, wherein said polymer-coated surface has an oleophibicity of at least Grade-1.

In one embodiment of the invention, said surface is a fiber.

In one embodiment of the invention, the diameter of the fiber is between about 10 nm and about 50 nm. In another embodiment, the diameter of the fiber is between about 10 nm and 500 nm. In another embodiment, the diameter of the fiber is between about 100 nm and 300 nm. In another embodiment, the diameter of the fiber is between about 100 nm and 500 nm. In another embodiment, the diameter of the fiber is between about 50 nm and 400 nm. In another embodiment, the diameter of the fiber is between about 200 nm and 500 nm. In another embodiment, the diameter of the fiber is between about 300 nm and 600 nm. In another embodiment, the diameter of the fiber is between about 400 nm and 700 nm. In another embodiment, the diameter of the fiber is between about 500 nm and 800 nm. In another embodiment, the diameter of the fiber is between about 500 nm and 1000 nm. In another embodiment, the diameter of the fiber is between about 1000 nm and 1500 nm. In another embodiment, the diameter of the fiber is between about 1500 nm and 3000 nm. In another embodiment, the diameter of the fiber is between about 2000 nm and 5000 nm. In another embodiment, the diameter of the fiber is between about 3000 nm and 4000 nm.

In one embodiment the aforementioned fiber is an electrospun fiber. In one embodiment the aforementioned fiber may have beads (i.e., non-uniformities in the diameter along the length of a fiber). In one embodiment of the invention, the average diameter of a bead is between about 500 nm and about 10000 nm. In one embodiment of the invention, the average diameter of a bead is between about 500 nm and about 1000 nm. In one embodiment of the invention, the average diameter of a bead is between about 1000 nm and about 1500 nm. In one embodiment of the invention, the average diameter of a bead is between about 1500 nm and about 2000 nm. In one embodiment of the invention, the average diameter of a bead is between about 2000 nm and about 2500 nm. In one embodiment of the invention, the average diameter of a bead is between about 2500 nm and about 3000 nm. In one embodiment of the invention, the average diameter of a bead is between about 3000 nm and about 3500 nm. In one embodiment of the invention, the average diameter of a bead is between about 3500 nm and about 4000 nm. In one embodiment of the invention, the average diameter of a bead is between about 4000 nm and about 4500 nm. In one embodiment of the invention, the average diameter of a bead is between about 4500 nm and about 5000 nm. In one embodiment of the invention, the average diameter of a bead is between about 5000 nm and about 5500 nm. In one embodiment of the invention, the average diameter of a bead is between about 5500 nm and about 6000 nm. In one embodiment of the invention, the average diameter of a bead is between about 6000 nm and about 6500 nm. In one embodiment of the invention, the average diameter of a bead is between about 6500 nm and about 7000 nm. In one embodiment of the invention, the average diameter of a bead is between about 7000 nm and about 7500 nm. In one embodiment of the invention, the average diameter of a bead is between about 7500 nm and about 8000 nm. In one embodiment of the invention, the average diameter of a bead is between about 8000 nm and about 8500 nm. In one embodiment of the invention, the average diameter of a bead is between about 8500 nm and about 9000 nm. In one embodiment of the invention, the average diameter of a bead is between about 9000 nm and about 9500 nm. In one embodiment of the invention, the average diameter of a bead is between about 9500 nm and about 10000 nm. In another embodiment the aforementioned fiber is bead-free.

In one embodiment, said surfaces exhibit surface roughness properties. The term “surface” or “surfaces” can mean any surface of any material, including glass, plastics, metals, polymers, and like. It can include surfaces constructed out of more than one material, including coated surfaces. Non-limiting examples of surfaces include woven and nonwoven fiber mats, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), and poly(ethylene terephthalate) (PET).

In one embodiment, said aforementioned surface comprises a silicon structure (e.g. a polysiloxane). In certain embodiments, said silicon structure is a resin, linear, branched, cross-linked, cross-linkable silicone structure or any combination thereof. In one embodiment, said silicon structure is polydimethylsiloxane (PDMS).

In one embodiment, said aforementioned surface is a superhydrophobic fiber mat comprising a plurality of the aforementioned fibers. In one embodiment, said superhydrophobic fiber mat is electrospun. In another embodiment, said superhydrophobic fiber mat exhibits wettability properties. In another embodiment, the fibers within the mat are uniform. In another embodiment, the mat is composed solely of fibers randomly oriented in a plane.

In one embodiment of the invention, said superhydrophobic fiber mat may exhibit pore sizes of between about 0.01 microns to about 100 microns. In another embodiment, the mat may exhibit pore sizes of between about 0.1 microns to about 100 microns. In another embodiment, the mat may exhibit pore sizes of between about 0.1 microns to about 50 microns. In another embodiment, the mat may exhibit pore sizes of between about 0.1 microns to about 10 microns. In another embodiment, the mat may exhibit pore sizes of between about 0.1 microns to about 5 microns. In another embodiment, the mat may exhibit pore sizes of between about 0.1 microns to about 2 microns. In another embodiment, the mat may exhibit pore sizes of between about 0.2 microns to about 1.5 microns. In another embodiment, the pore size may be non-uniform. In another embodiment, the pore size may be uniform.

Selected Coating Methods of the Invention

One aspect of the present invention relates to a method of coating a surface with a polymer, comprising the step of depositing a monomer on a surface using chemical vapor deposition, thereby forming a polymer-coated surface; wherein said monomers is represented by formula I:

I

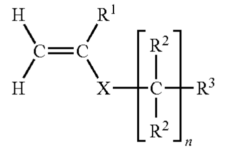

wherein, independently for each occurrence,

R is -hydrogen, -halogen, -alkyl, -cycloalkyl, -heterocycloalkyl, -alkenyl, -cycloalkenyl, -heterocycloalkenyl, -alkynyl, -cyano, -aryl or -heteroaryl;

$R^1$ is hydrogen or alkyl;

$R^2$ is -hydrogen, -halogen, -alkyl, -cycloalkyl, -heterocycloalkyl, -alkenyl, -cycloalkenyl, -heterocycloalkenyl, -alkynyl, -aryl or -heteroaryl;

$R^3$ is -fluoroalkyl, -fluorocycloalkyl, -fluoroheterocycloalkyl, -fluoroalkenyl, -fluorocycloalkenyl, -fluoroheterocycloalkenyl, -fluoroalkynyl, -fluoroaryl or -fluoroheteroaryl;

X is absent, —O—, —N(R)—, —S—, —C(═O)O—, —C(═O)N(R)—, —C(═O)S—, —S(═O)—, —$S(=O)_2$—, —C(═O)—, —C(═NR)—, —C(═S)—, —C(R)═C(R)—, —C≡C—, -cycloalkyl-, -heterocycloalkyl-, -cycloalkenyl-, -heterocycloalkenyl-, -aryl- or -heteroaryl-; and n is 0 to 10 inclusive.

In certain embodiments, the present invention relates to the method, wherein $R^1$ is hydrogen or methyl.

In certain embodiments, the present invention relates to the method, wherein $R^1$ is hydrogen.

In certain embodiments, the present invention relates to the method, wherein $R^1$ is methyl.

In certain embodiments, the present invention relates to the method, wherein $R^2$ is hydrogen, halogen or alkyl.

In certain embodiments, the present invention relates to the method, wherein $R^2$ is hydrogen.

In certain embodiments, the present invention relates to the method, wherein $R^3$ is fluoroalkyl, fluoroaryl or fluroaralkyl.

In certain embodiments, the present invention relates to the method, wherein $R^3$ is fluoroalkyl.

In certain embodiments, the present invention relates to the method, wherein X is —O—, —N(R)—, —C(═O)O—, —C(═O)N(R)—, —C(═O)—, -aryl- or -heteroaryl-.

In certain embodiments, the present invention relates to the method, wherein X is —C(═O)O—.

In certain embodiments, the present invention relates to the method, wherein n is 0-3 inclusive.

In certain embodiments, the present invention relates to the method, wherein n is 4-6 inclusive.

In certain embodiments, the present invention relates to the method, wherein n is 7-10 inclusive.

Another aspect of the present invention relates to a method of coating a surface with a polymer, comprising the step of depositing a monomer on a surface using chemical vapor deposition, thereby forming a polymer-coated surface; wherein said monomers is represented by formula II:

II

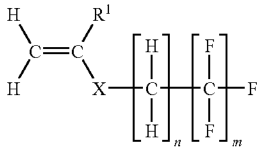

wherein, independently for each occurrence,

R is -hydrogen, -halogen, -alkyl, -cycloalkyl, -heterocycloalkyl, -alkenyl, -cycloalkenyl, -heterocycloalkenyl, -alkynyl, -cyano, -aryl or -heteroaryl;

$R^1$ is hydrogen or alkyl;

X is —O—, —N(R)—, —C(═O)O—, —C(═O)N(R)—, —C(═O)—, —C(═NR)—,

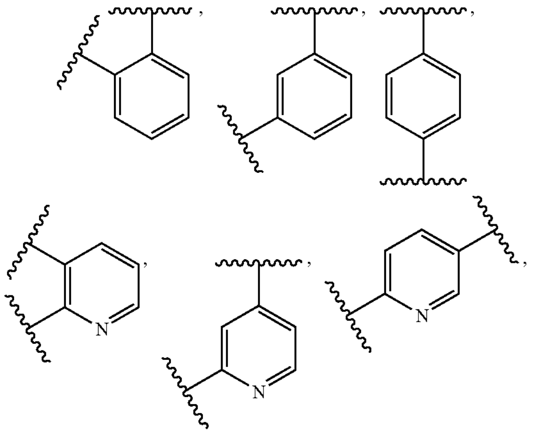

-continued

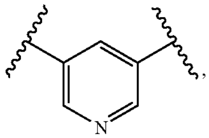

, or

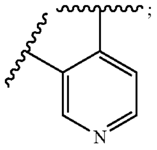

;

n is 0 to 10 inclusive; and m is 5 to 15 inclusive.

In certain embodiments, the present invention relates to the aforementioned method, wherein $R^1$ is hydrogen or methyl.

In certain embodiments, the present invention relates to the aforementioned method, wherein $R^1$ is hydrogen.

In certain embodiments, the present invention relates to the aforementioned method, wherein $R^1$ is methyl.

In certain embodiments, the present invention relates to the aforementioned method, wherein X is —C(═O)O—, —C(═O)N(R)— or —C(═O)—.

In certain embodiments, the present invention relates to the aforementioned method, wherein X is —C(═O)O—.

In certain embodiments, the present invention relates to the aforementioned method, wherein n is 0-3 inclusive.

In certain embodiments, the present invention relates to the aforementioned method, wherein n is 2.

In certain embodiments, the present invention relates to the aforementioned method, wherein m is 6-9 inclusive.

In certain embodiments, the present invention relates to the aforementioned method, wherein m is 7.

Another aspect of the present invention relates to a method of coating a surface with a polymer, comprising the step of depositing a monomer on a surface using chemical vapor deposition, thereby forming a polymer-coated surface; wherein said monomers is represented by formula III:

III

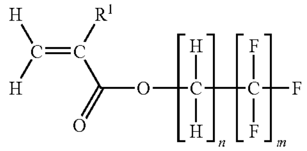

wherein, independently for each occurrence, $R^1$ is hydrogen or methyl;

n is 0 to 5 inclusive; and m is 5 to 10 inclusive.

In certain embodiments, the present invention relates to the aforementioned method, wherein $R^1$ is hydrogen or methyl.

In certain embodiments, the present invention relates to the aforementioned method, wherein $R^1$ is hydrogen.

In certain embodiments, the present invention relates to the aforementioned method, wherein $R^1$ is methyl.

In certain embodiments, the present invention relates to the aforementioned method, wherein n is 2.

In certain embodiments, the present invention relates to the aforementioned method, wherein m is 7.

In certain embodiments, the present invention relates to the aforementioned method, wherein $R^1$ is methyl; n is 2; and m is 7.

In one embodiment of the invention, the voltage applied in the electrospinning is from about 5 to about 50 KV. In another embodiment, the voltage applied in the electrospinning is from about 10 to about 40 KV. In another embodiment, the voltage applied in the electrospinning is from about 15 to about 35 KV. In another embodiment, the voltage applied in the electrospinning is from about 20 to about 30 KV. In another embodiment, the voltage applied in the electrospinning is about 30 KV.

In one embodiment of the invention, the distance between electrodes in the electrospinning is from about 10 to about 100 cm. In another embodiment, the distance between electrodes in the electrospinning is from about 10 to about 75 cm. In another embodiment, the distance between electrodes in the electrospinning is from about 20 to about 50 cm. In another embodiment, the distance between electrodes in the electrospinning is from about 27 cm. In another embodiment, the distance between electrodes in the electrospinning is from about 40 cm. In another embodiment, the distance between electrodes in the electrospinning is about 45 cm.

In one embodiment of the invention, the flow rate in the electrospinning is from about 0.005 mL/min and about 0.5 mL/min. In another embodiment, the flow rate in the electrospinning is from about 0.005 mL/min and about 0.01 mL/min. In another embodiment, the flow rate in the electrospinning is from about 0.01 mL/min and 0.1 mL/min. In another embodiment, the flow rate in the electrospinning is from 0.02 mL/min and 0.1 mL/min. In another embodiment, the flow rate in the electrospinning is about 0.05 mL/min. In another embodiment, the flow rate in the electrospinning is about 0.025 mL/min. All flow rates are given as per spinnerette.

In one embodiment of the invention, the electric current in the electrospinning is from about 10 nA and about 10,000 nA. In another embodiment, the electric current in the electrospinning is from about 10 nA and about 1000 nA. In another embodiment, the electric current in the electrospinning is from about 50 nA and about 500 nA. In another embodiment, the electric current in the electrospinning is from about 75 nA and about 100 nA. In another embodiment, the electric current in the electrospinning is around about 85 nA.

In one embodiment of the invention, a parallel plate setup is used in the electrospinning. In one embodiment, electrospinning is conducted with the aid of any suitable apparatus as will be known to one skilled in the art.

In one embodiment of the invention, wherein said chemical vapor deposition is initiated chemical vapor deposition. In one embodiment of the invention, a steel filament array is used in said initiated chemical vapor deposition.

Initiated chemical vapor deposition is capable of producing a range of polymeric and multifunctional nanocoatings. Coatings can be made extremely thin (down to about 10 nm) on objects with dimensions in the nanometer range (e.g., carbon nanotubes, woven and non-woven fibers). Importantly, in certain embodiments, the object to be coated remains at room temperature, which means that nanothin coatings can be prepared on materials ranging from plastics to metals. The process is also conformal, which means it provides uniform coverage on objects which have small, complex, three-dimensional geometries.

Initiated CVD generally takes place in a reactor. Precursor molecules, consisting of initiator and monomer species, are fed into the reactor. This can take place at a range of pressures from atmospheric pressure to low vacuum. An extremely thin, conformal layer of monomer molecules continually adsorbs to the substrate surface. The initiator is broken down through the addition of thermal energy or radiative energy (UV) to form free radicals, which subsequently add to a monomer molecule and cause polymerization to proceed in a manner analogous to well-known solution polymerization. In this manner, complex substrates can be conformably coated. During the deposition the substrate is kept at a relatively low temperature, generally room temperature up to about 60° C. The process is solvent-free. The iCVD process can also use plasma excitation to generate initiating free radicals. The can be done by flowing gas-phase monomer or by atomization of the liquid monomer species through a plasma field.

The initiated chemical vapor deposition coating process can take place at a range of pressures from atmospheric pressure to low vacuum. In certain embodiments, the pressure is less than about 0.5 torr; in yet other embodiments the pressure is less than about 0.4 torr, or less than about 0.3 torr. In certain embodiments the pressure is about 0.3 torr.

As mentioned above, the substrate in an initiated chemical vapor deposition coating process can be kept at any temperature within a range (e.g. by controlling the stage temperatures). In certain embodiments the temperature is ambient temperature. In certain embodiments the temperature is about 25° C.; in yet other embodiments the temperature is about 35° C.; in yet other embodiments the temperature is between about 25° C. and about 50° C., or between about 0° C. and about 25° C.

In certain embodiments, the present invention relates to the aforementioned method, wherein said polymer coating is of a uniform thickness (i.e., said thickness does not vary more than about 10% over the surface; or by more than about 5% over the surface; or by more than about 1% over the surface). In certain embodiments, said polymer coating has a mass per surface area of less than about 500 $\mu g/cm^2$. In certain embodiments, said polymer coating has a mass per surface area of less than about 100 $\mu g/cm^2$. In certain embodiments, said polymer coating has a mass per surface area of less than about 50 $\mu g/cm^2$. In certain embodiments, said polymer coating has a mass per surface area of less than about 10 $\mu g/cm^2$. In certain embodiments, said polymer coating has a mass per surface area of less than about 5 $\mu g/cm^2$.

In certain embodiments, the present invention relates to the aforementioned method, wherein said polymer coating has an average thickness of less than about 75 nm. In certain embodiments, said polymer coating has an average thickness of about 70 nm. In certain embodiments, said polymer coating has an average thickness of about 80 nm. In certain embodiments, said polymer coating has an average thickness of about 90 nm. In certain embodiments, said polymer coating has an average thickness of about 100 nm. In certain embodiments, said polymer coating has a thickness in the range of about 70 nm to about 100 nm.

Selected Articles of Manufacture of the Invention

In one embodiment, this invention provides an article of manufacture including a superhydrophobic fiber according to this invention. In another embodiment, this invention provides an article of manufacture including a fiber mat according to this invention, wherein said fiber mat comprises the superhydrophobic fibers of the invention. In another embodiment, the article of manufacture is, inter alia, a waterproof substance. In another embodiment the article of manufacture is, inter alia, a water resistant substance. In another embodiment, the article of manufacture is, inter alia, a self-cleaning substance. In another embodiment, the article of manufacture is, inter alia, a water draining substance. In another embodiment, the article of manufacture is, inter alia, a coating substance. In another embodiment, the coating substance reduces drag. In another embodiment, the coating substance reduces drag in a gas, in a liquid or in both. In another embodiment, the gas is air. In another embodiment, the liquid is water.

In another embodiment of this invention, the article of manufacture is a membrane.

In another embodiment of this invention, the article of manufacture is, inter alia, manufacture is a fabric. In another embodiment, the fabric is, inter alia, a breathable fabric. In another embodiment, the fabric may have, inter alia, a filtration functionality. In another embodiment, the fabric may have, inter alia, an absorptive functionality. In another embodiment, the fabric is, inter alia, a non-woven fabric. In another embodiment, the fabric is, inter alia, a waterproof fabric. In another embodiment, the fabric is, inter alia, a water resistant fabric.

In one embodiment of the invention, the fabric is a superhydrophobic fabric. In another embodiment, the fabric is an electrospun fibrous fabric. In one embodiment of the invention, the fabric may exhibit a water contact angle of above about 160°. In another embodiment, the fabric may exhibit a water contact angle of about 165°. In another embodiment, the fabric may exhibit a water contact angle of about 170°. In another embodiment, the fabric may exhibit a water contact angle of about 175°. In another embodiment, the fabric may exhibit a water contact angle of about 160° to about 165°. In another embodiment, the fabric may exhibit a water contact angle of about 150° to about 160°. In another embodiment, the fabric may exhibit a water contact angle of about 160° to about 165°. In another embodiment, the fabric may exhibit a water contact angle of about 160° to about 170°. In another embodiment, the fabric may exhibit a water contact angle of about 160° to about 175°.

In one embodiment of the invention, the fabric may exhibit a water contact angle hysteresis of between about 10° to about 15°. In another embodiment the fabric may exhibit a water contact angle hysteresis of between about 10° to about 14°. In another embodiment the fabric may exhibit a water contact angle hysteresis of between about 8° to about 13°. In another embodiment the fabric may exhibit a water contact angle hysteresis of between about 6° to about 12°. In another embodiment the fabric may exhibit a water contact angle hysteresis of between about 5° to about 10°. In another embodiment the fabric may exhibit a water contact angle hysteresis of between about 0° to about 5°.

In another embodiment of this invention, the article of manufacture is, inter alia, a drug delivery system. In another embodiment, the article of manufacture is, inter alia, a bandage or patch. In another embodiment, the bandage or patch may include, inter alia, a drug.

Selected iCVD Initiators of the Invention

In principle, any compound which decomposes into free radicals under the initiated chemical vapor deposition conditions can be used. In certain embodiments, said initiator is selected from the group consisting of hydrogen peroxide, alkyl or aryl peroxides (e.g., tert-butyl peroxide, hydroperoxides, halogens and nonoxidizing initiators, such as azo compounds (e.g., bis(1,1-dimethyl)diazene).

Selected Electrospun Fibers of the Invention

In principle, any electrospun material, including those that may dissolve or decompose upon exposure to certain solvents or high temperatures, can be used.

In certain embodiments, the eletrospinnable fiber is comprised of a homopolymer, a copolymer or a blend of polymers selected from the group consisting of alginates, aromatic copolyesters, cellulose acetates, cellulose nitrites, collagens, ethylene-methacrylic acid copolymers, ethylene-vinyl acetate copolymers, fluoropolymers, modified celluloses, neoprenes, poly(p-xylylene), polyacrylamides, polyacrylates, polyacrylonitriles, polyamides, polyarylamides, polyarylenevinylenes, polybenzimidazoles, polybenzothiazoles, polybutadienes, polybutenes, polycarbonates, polyesters, polyether ketones, polyethers, polyethylenes, polyhydroxyethyl methacrylates, polyimides, polylactides, polylactones, polymethacrylates, polymethacrylonitriles, polymethylmethacrylates, poly-N-vinylpyrrolidones, polyolefins, polyoxazoles, polyphenylene, polypropylenes, polysilanes, polysiloxanes, polystyrenes, polysulfides, polysulfones, polytetrafluoroethylenes, polyurethaness, polyvinyl acetates, polyvinylacetate-methacrylic copolymers, polyvinylidene chlorides and unmodified celluloses.

In certain embodiments the eletrospinnable fiber is comprised of a homopolymer, a copolymer or a blend of polymers selected from the group consisting of polyisobutylenes, polyolefins, halogen-containing polymers, silicon-containing polymers (e.g. polysiloxanes), polystyrenes, polyacrylates, polyurethanes, polyesters, polyamides, collagens, silks, cellulosics and any derivatives thereof or combination thereof.

In certain embodiments, the electrospun fiber is comprised of a natural protein polymers (e.g., silk or actin), natural polysaccharides (e.g., collagen). In certain embodiments, the eletrospinnable fiber is comprised of non-natural protein polymers or polysaccharides.

In certain embodiments, the electrospun fiber is comprised of a polyester. In certain embodiments, the electrospun fiber is comprised of a poly(hydroxyaklanoates) (e.g., polylactide or polylactones such as polyglycolic acid, polylactide, polycaprolactone, polyhydroxybutyrate and polyhydroxyvalerate, among others). In one embodiments, the electrospun fiber comprises a polylactone. In another embodiment, the electrospun fiber is comprised of a poly(caprolactone).

Fluoroacryate-Coated Poly(caprolactone)

Poly(caprolactone) (PCL) was used due to the ease with which fibers can be formed over a range of diameters, which in turn permits a more detailed study of the role of fiber morphology on hydrophobicity. PCL is well known for its biodegradability and has been electrospun into fiber mats for the use of scaffolds in tissue engineering. Yoshimoto, H.; Shin, Y. M.; Terai, H.; Vacanti, J. P. *Biomaterials* 2003, 24, 2077; and Li, W-J.; Tuli, R.; Okafor, C.; Derfoul, A; Danielson, K. G.; Hall, D. J.; Tuan, R. S. *Biomaterials* 2005, 26, 599. The morphology of PCL fibers can be simply tailored by varying the concentration and operating parameters during electrospinning. Lee, K. H.; Kim, H. Y.; Khil, M. S.; Ra, Y. M.; Lee, D. R. *Polymer* 2003, 44, 1287. In the subsequent iCVD process, a fluoroacryate, PFEMA, is polymerized to coat the electrospun mats. Contact angle measurements revealed that all the poly(perfluoroalkyl ethyl methacrylate) (PPFEMA) modified PCL samples exhibited superhydrophobicity. On one hand, the hierarchical structure of the electrospun mat, comprising nano-scale fibers and micron-scale beads and interfibrillar distances, dramatically increases the surface roughness and the fraction of contact area of water with the air trapped in the apertures among fibers; on the other hand, the thin layer of PPFEMA coating prevents the water from sinking into the cavities and pinning to the surface. The combination of these two effects is believed to contribute to the superhydrophobicity of the iCVD-coated electrospun mats. In general, thin fibers having a high density of beads are more hydrophobic than thicker, bead-free fibers.

Figure 2:
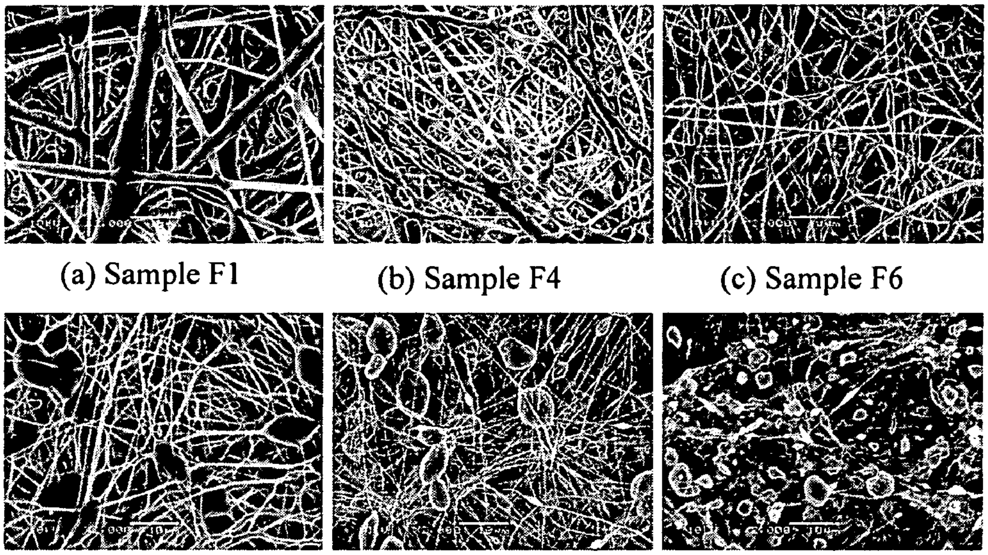
FIG. 2 depicts SEM images of various PCL electrospun mats (scale bars=10 μm).

PCL mats with different fiber morphologies, including beaded fibers and bead-free fibers as well as variations in fiber diameter, were obtained by varying the concentrations and operating parameters during electrospinning (See Table 1 in Exemplification). Selected SEM images are shown in FIG. 2. As the label index increases, the average fiber diameter decreases for both the bead-free and beaded fibers as quantified in Table 1. For beaded fibers, the average diameter refers to the diameter of the threads between the beads. Additionally, the bead size decreases and the bead density increases with increasing label index of the beaded samples. The areal bead density can be defined as the number of beads per unit area, while a linear bead density can be defined as the number of beads per unit length of fiber. However, both of these are difficult to quantify in a meaningful way, since the areal bead density depends also on the thickness of the mat and the density of fibers therein, while the linear bead density requires an analysis of the total linear length of fibers as well as a count of the number of beads present in a sample of material. Herein the bead density is only characterized in a qualitative sense (i.e., through visualization) under the assumption that mat thickness and fiber density are qualitatively similar for all mats. The transition from bead-free fibers to beaded fibers is believed to result partly from the late onset of nonlinear viscoelastic effects during growth of a Rayleigh instability in the whipping portion of the jet. Fong, H.; Chun, I.; Reneker, D. H. *Polymer* 1999, 40, 4585; Yarin, A. L.; Koombhongse, S.; Reneker, D. H. *J. Appl. Phys.* 2001, 89, 3018; and McKee, M. G.; Wilkes, G. L.; Colby, R. H.; Long, T. E. *Macromolecules* 2004, 37, 1760.

Figure 3:
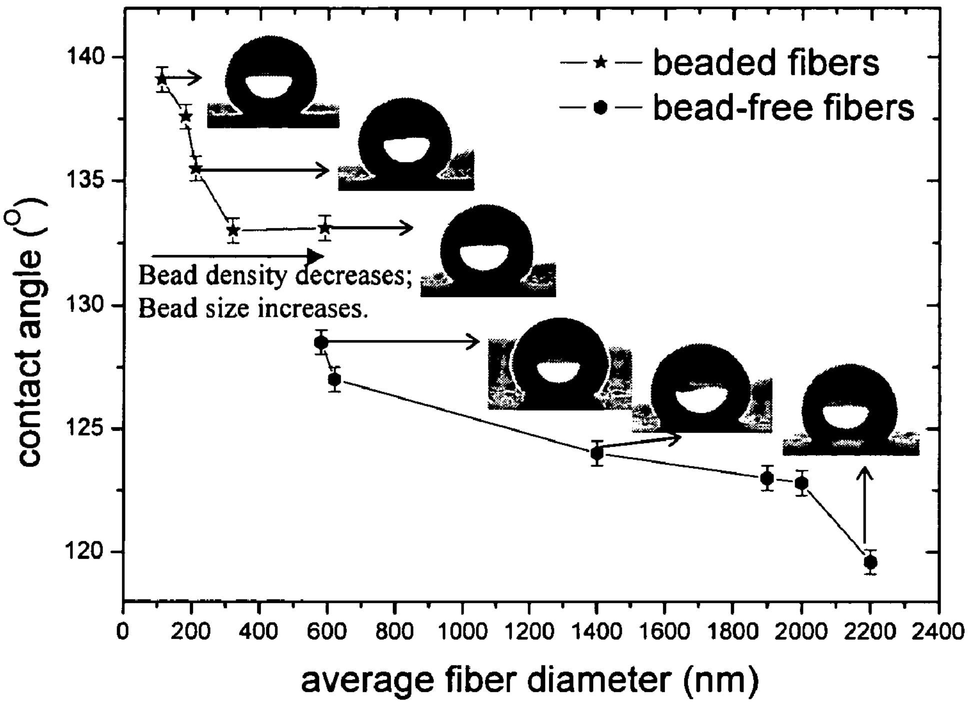
FIG. 3 depicts the contact angles for various as-spun PCL mats. From bottom to top in the inset are representative droplet images on Sample F1, Sample F4, Sample F6, Sample B1, Sample B3, and Sample B5. The contact angles are 119°, 124°, 129°, 133°, 135°, and 139°, respectively. The error bars are indicative of statistical variations among multiple measurements; other sources of uncertainty, such as image quality, curve fitting procedures, and operator estimation, suggest that the uncertainty in contact angle determination could ±3°.

The hydrophobicity of the as-spun PCL mats was studied. FIG. 3 shows how the initial contact angle (measured within 1 minute of placement of the drop on the mat) varies with average fiber diameter. Selected droplet images are shown in the inset. Since the PCL is not a hydrophobic material (PCL solution cast film shows a contact angle of 60°), the initial hydrophobicity of the as-spun mats is metastable: the contact angle decreases gradually with time over a period of about 20 minutes under ambient conditions. The origin of this decrease in contact angle is believed to be due to two effects. The first is the evaporation of water from the droplet, which changes the contact angle from advancing to receding. The second is conversion of the contact zone from an initial Cassie-Baxter state to a final Wenzel state as the water droplet sinks into the interstices of the mat. Significantly, Wenzel's equation predicts a lower apparent contact angle for a rough surface if the material is not hydrophobic (i.e., Young' contact angle is less than 90°). The formation initially of a Cassie-Baxter state, wherein the droplet sits on a heterogeneous surface of fiber and air, could be a consequence of trapping the air when the droplet is first placed gently on such a fibrous mat. The metastable nature of the Cassie-Baxter state in this case can also be demonstrated by applying pressure to the droplet, or by allowing the droplet to fall freely from an elevated height to contact with the mat. Acatay, K.; Simsek, E.; Ow-Yang, C.; Menceloglu, Y. Z. *Angew. Chem. Int. Ed.* 2004, 43, 5210; and Quéré, D. *Nature Mater.* 2002, 1, 14. Dropping the beads of water onto the mat from a height of 8 cm, contact angles for these same as-spun mats as low as 10° were observed. This metastable hydrophobic state is further verified by the fact that the droplet does not slide even when the mat is tilted to 90° due to the pinning effect. Nevertheless, the initial contact angles still provide useful information on surface roughness. Namely, as shown in FIG. 3, the contact angles for both beaded fibers and bead-free fibers increase as the average fiber diameter decreases. The contact angles for the beaded fibers increase as the bead density increases and the bead size decreases. Therefore, it was concluded that the thinner, beaded fibers generally have higher surface roughness and, therefore, generally higher initial contact angles than the thicker, bead-free fibers.

Figure 4:
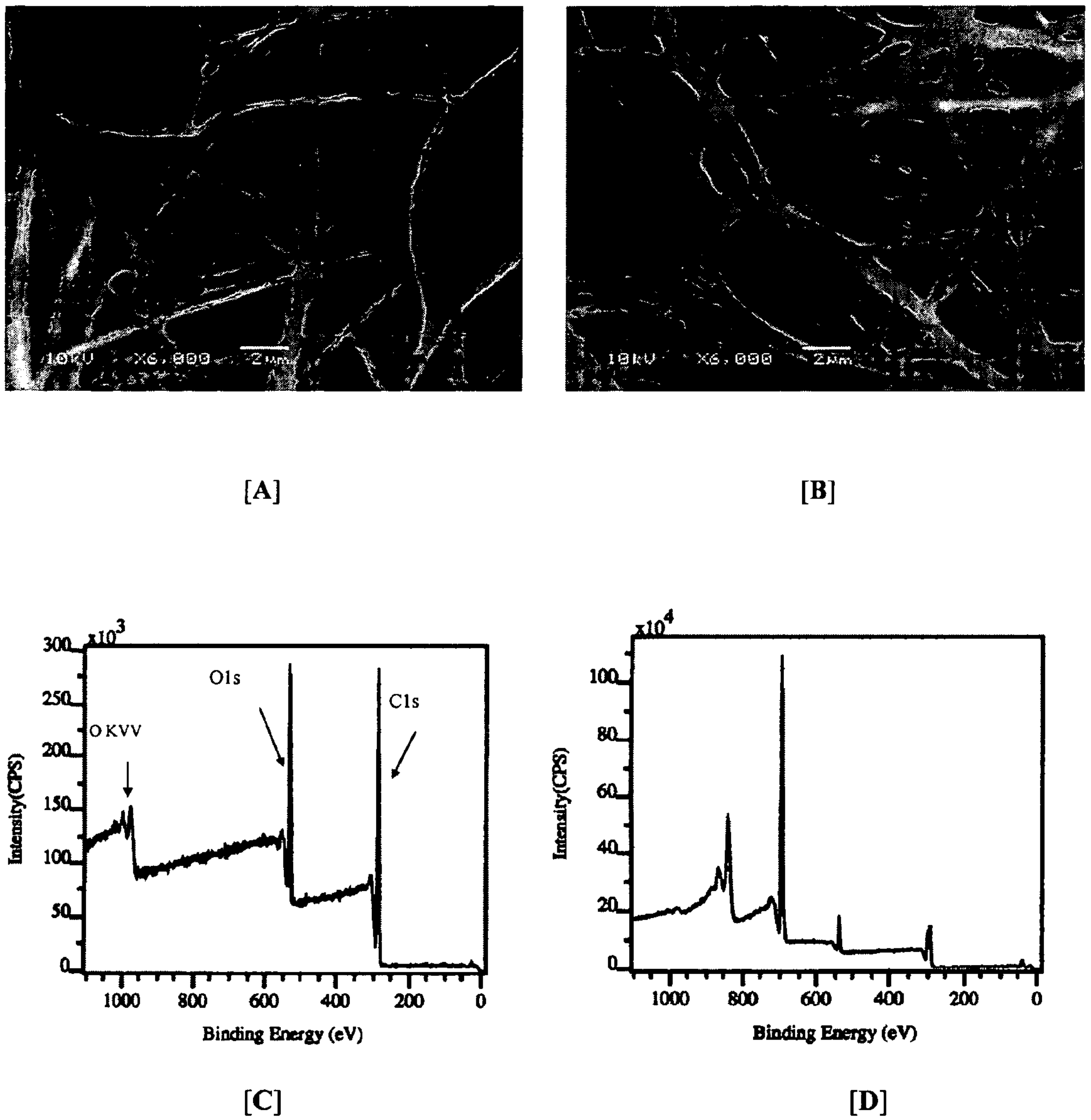
FIG. 4 depicts SEM images of Sample B1 (a) before and (b) after initiated chemical vapor (iCVD) coating (Scale bars=2 μm); (c) and (d) depict XPS data for (a) and (b), respectively.

To obtain a stable superhydrophobicity for these electrospun PCL mats, surface modification through iCVD coating is employed. A thin and conformal iCVD coating can dramatically decrease the surface energy while maintaining the inherent surface roughness of the electrospun mats. FIGS. 4(*a*) and 4(*b*) shows representative SEM images of a PCL mat (Sample B1) before and after coating. The thickness of the PPFEMA coating is difficult to determine directly on the fibers, however a coating thickness of about 70 nm was measured on a reference silicon wafer. The thickness is anticipated to be smaller for the coating on the fibers due to the high surface area of the electrospun mats. The conformal nature of the iCVD process results in little overall change in the hierarchical nature of the mat morphology, the only visually observable change being the slight increase in fiber diameter.

XPS scans were used to verify further the presence of PPFEMA on the coated mats. FIGS. 4(*c*) and 4(*d*) show the XPS scans of an as-spun PCL mat (Sample B1) and the same mat coated with PPFEMA. FIG. 4(*d*) shows that the PPFEMA-coated mat contains a strong peak in the 690-700 eV region. This peak is characteristic of fluorine 1s and indicates the presence of PPFEMA on these substrates. The XPS scan of the uncoated mat in FIG. 4(*c*) confirms that it does not contain any characteristic fluorine peaks, as expected.

Figure 5:
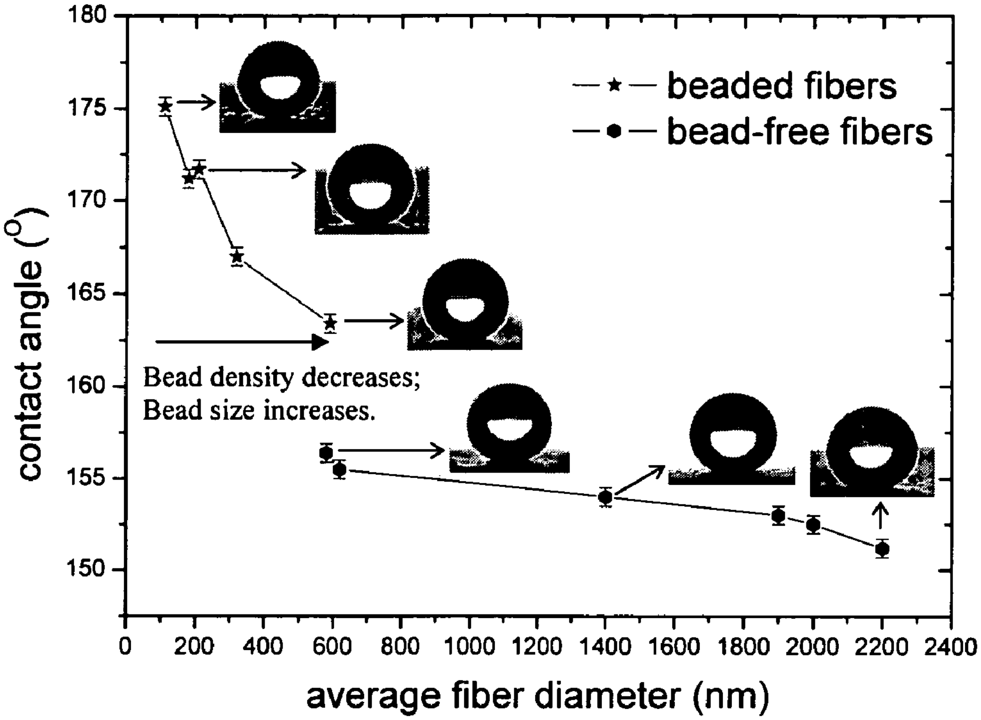
FIG. 5 depicts contact angles for PPFEMA-coated PCL mats. From right to left in the inset are representative droplet images on Sample F1, Sample F4, Sample F6, Sample B1, Sample B3, and Sample B5. The corresponding contact angles are 151°, 154°, 156°, 163°, 172°, and 175°, respectively. The error bars are indicative of statistical variations among multiple measurements; other sources of uncertainty, such as image quality, curve fitting procedures, and operator estimation, suggest that the uncertainty in contact angle determination could be ±3°.

The contact angles for water on all the PPFEMA-coated PCL mats are summarized in FIG. 5, with selected droplet images shown in the inset. The highest contact angle for the PPFEMA coated mats is larger than 175°. In FIG. 5, thinner, beaded fibers are observed to give mats with higher contact angles than thicker, bead-free fibers, which is in good agreement with the trend for the as-spun mats. Specifically, for bead-free fibers, mats with smaller fibers are more hydrophobic than those with larger fibers; for beaded fibers, a high density of smaller beads imparts higher hydrophobicity than a low density of larger beads. Lastly, for the same fiber diameters, the mats with beaded fibers are more hydrophobic than those composed of bead-free fibers. In contrast to the metastable hydrophobicity of the as-spun PCL mats, the superhydrophobicity of the PPFEMA coated mats is stable; a free falling droplet bounces off the surface and splits into smaller droplets instead of spreading on the mat and penetrating into the interstices, as in the case of as-spun mats.

Figure 6:
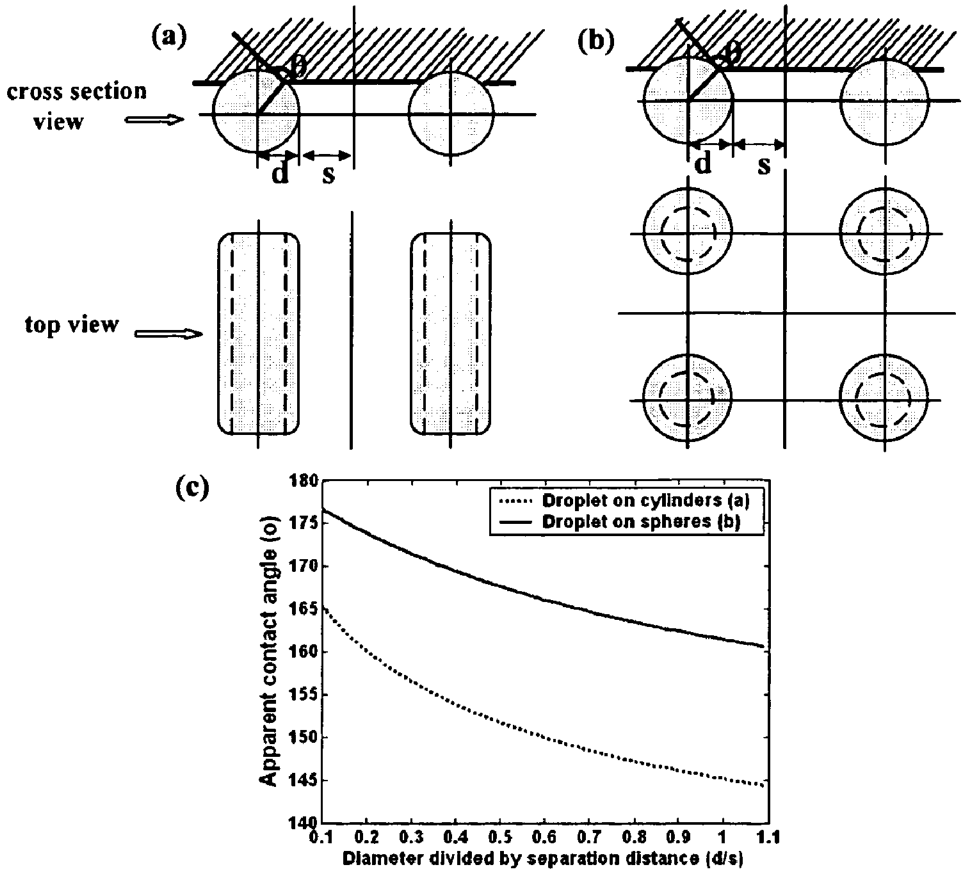
FIG. 6 depicts schematic representations of water droplets sitting on (a) cylinders and (b) spheres. The shaded areas represent water and the dashed lines represent triphasic contact lines. (c) Corresponding apparent contact angles for (a) and (b).

To understand better the effect of fiber morphology on the superhydrophobicity, theoretical studies were performed using the Cassie-Baxter equation. Cassie, A. B. D.; Baxter, S. *Trans. Faraday Soc.* 1944, 40, 546. For the sake of simplicity, parallel cylinders were used to represent bead-free fibers and square-packed spheres to represent the beads on the fibers (see FIG. 6). FIG. 6(*a*) shows cross sectional and top-down views of the water droplet sitting across the fibers, where the bending of the water-fiber interface and the contact area is determined by the intrinsic contact angle, θ, as shown in the figure. FIG. 6(*b*) shows cross sectional and top-down views of the droplet sitting on the tops of beads, where the wetted area enclosed by the dash lines is determined again by the intrinsic contact angle. It was assumed the water can be described by the Cassie Baxter state and thus does not penetrate into the apertures of the mat. This assumption is valid for the mats employed because the hydrostatic pressure which must be overcome in order for penetration to occur is much larger than atmospheric pressure for micrometer-sized apertures. Youngblood, J. P.; McCarthy, T. J. *Macromolecules* 1999, 32, 6800. The contact angle, θ, for PPFEMA is 119°, obtained by measuring the contact angle on the PPFEMA-coated silicon wafer. One can calculate the apparent contact angle, θ*, as a function of x=d/s, the ratio of diameter (cylinder or sphere) to separation distance, using the following equations:

$$\cos\theta^* = \frac{x(\pi-\theta)}{x+1}\cos\theta + \frac{x\sin\theta}{x+1} - 1$$

for the case of cylinders and $$\cos\theta^* = \frac{\pi x^2(1+\cos\theta)}{2(x+1)^2}\cos\theta + \frac{\pi x^2\sin^2\theta}{4(x+1)^2} - 1$$

for the case of spheres. FIG. 6(*c*) shows how these theoretical apparent contact angles for PPFEMA-coated cylinders and spheres vary with d/s. The contact angle decreases as the diameter increases if the separation distance is fixed. FIG. 6 also shows that the droplet sitting on spheres has a higher contact angle than that sitting on cylinders of comparable radius. Both of the predictions are consistent with the experimental data. No attempt is made here to fit the data precisely, since the random orientation of fibers in the real materials, as well as the three-dimensional nature of the mats imaged, for example, in FIG. 2, complicate the determination of an appropriate value for the separation distance between fibers. For beaded fibers, the assumption that the droplet only sits on beads might also break down if the areal bead density is so low that the normal component of surface tension is not sufficient to suspend the droplet only on beads (e.g., see Sample B1). At this point, it was hypothesized that if the water sits on both fibers and beads, the contact angle values should fall between the two curves depicted in FIG. 6(*c*). Nevertheless, the simplified model provides useful ranges of contact angles for both bead-free fibers and beaded fibers and all the experimental contact angles roughly fall in these ranges.

Figure 7:
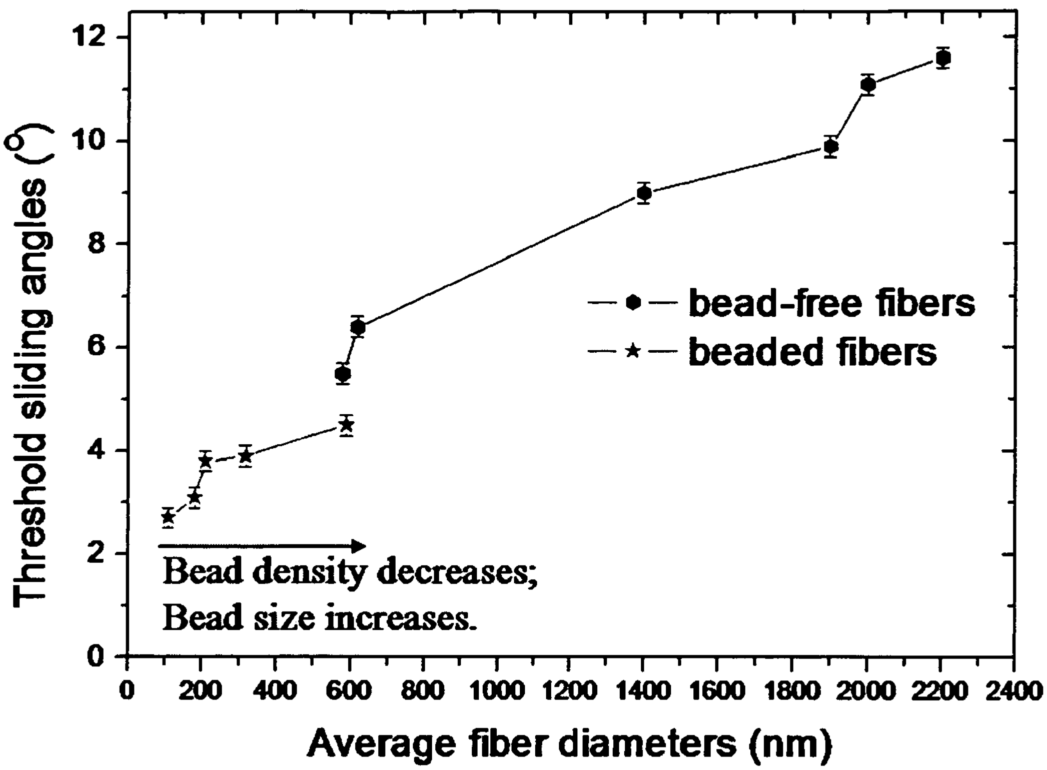
FIG. 7 depicts threshold sliding angles for the PPFEMA-coated PCL mats as a function of average fiber diameter.

It has been suggested that a useful water-repellent surface should have not only a high static contact angle but also a low contact angle hysteresis or threshold sliding angle. Both the hysteresis and sliding angle are important parameters to determine the sliding resistance. FIG. 7 shows the threshold sliding angles of a 20 mg droplet on the PPFEMA-coated PCL mats with different fiber morphologies. The sliding angle is observed to decrease concurrent with the increase in superhydrophobicity from Sample F1 to F6 and from B1 to B5, confirming the conclusion made previously from the static contact angle measurements. All the sliding angles shown in FIG. 7 are less than 12°, again in direct contrast to the as-spun mats, where the droplet does not slide even when the surface is tilted to 90°. The lowest sliding angle is 2.5°, observed for Sample B5, which also has the highest static contact angle at 175°.

Figure 8:
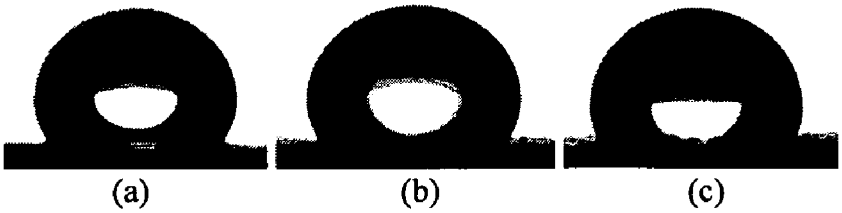
FIG. 8 depicts alkane droplets on the PPFEMA-coated Sample F1: (a) n-decane, (b) n-octane, and (c) n-heptane. The contact angles are 118°, 109°, and 92°, respectively.

The surface energies of these PPFEMA-coated PCL mats are low enough to result in oleophobicity. Oleophobicity has received much less attention but is often more desirable than simple superhydrophobicity and is generally more difficult to achieve. Chen, W.; Fadeev, A. Y.; Hsieh, M. C.; Oner, D.; Youngblood, J.; McCarthy, T. J. *Langmuir* 1999, 15, 3395; and Yabu, H.; Takebayashi, M.; Tanaka, M.; Shimomura, M. *Langmuir* 2005, 21, 3235. Oleophobicity together with superhydrophobicity can significantly enhance the self-cleaning ability of a surface, especially the resistance to organic contamination. The contact angles (see FIG. 8) of n-decane, n-octane and n-heptane on the PPFEMA-coated Sample F1 are 118°, 109°, and 92°, respectively, which are much larger than those on the PPFEMA-coated Si wafer (53°, 45°, and 32°, respectively), indicating at least a Grade-8 (n-heptane-phobic) oil repellency. Since the intrinsic contact angle for n-heptane on the a smooth PPFEMA film is less than 90°, the apparent contact angles on a rough PPFEMA surface should be even lower, according to the Wenzel equation. It was concluded that the contact angles shown in FIG. 8 are metastable, similar to the case for water on as-spun PCL mats. The 5 μL droplets of n-decane, n-octane and n-heptane at ambient temperature in stagnant air exhibit contact angles lower than 90° in periods of about 39, 6 and 1 minutes, respectively. It is anticipated that these times would also depend on the alkane evaporation rate, which includes factors such as temperature, air velocity, and droplet size.

EXEMPLIFICATION

PCL (Aldrich) with a weight-averaged molecular weight ($M_w$) of 80,000 was used. A series of PCL solutions of different concentrations were made with a mixture of chloroform (Aldrich) and methanol (Aldrich) (3/1 by weight) as the solvent. The solutions were electrospun using a parallel plate setup to provide a uniform electric field and to avoid corona discharge at high voltages, as described previously. Shin, Y. M.; Hohman, M. M.; Brenner, M. P.; Rutledge, G. C. *Polymer* 2001, 42, 9955. The concentrations and operating parameters are summarized in Table 1 below.

The fiber morphologies were observed by a JEOL-6060SEM (JEOL Ltd, Japan) scanning electron microscope (SEM). The fibers were sputter-coated with a 2-3 nm layer of gold for imaging using a Desk II cold sputter/etch unit (Denton Vacuum LLC, NJ). The fiber diameters and bead sizes were determined using AnalySIS image processing software (Soft Imaging System Corp., Lakewood, USA).

TABLE 1

Solution concentrations, operating parameters and average fiber diameter and bead size of PCL electrospun mats. Sample labels starting with "F" are bead-free fibers while those starting with "B" are beaded fibers.

| Sample index | Concentration (wt %) | Flow rate (ml/min) | Voltage (KV) | Plate-to-plate distance (cm) | Fiber morphology: Average fiber diameter (nm) | Fiber morphology: Average bead size (nm) |
|---|---|---|---|---|---|---|
| F1 | 11.5 | 0.05 | 37.6 | 27 | 2200 | no bead |
| F2 | 10.0 | 0.05 | 35.0 | 27 | 2000 | no bead |
| F3 | 9.2 | 0.025 | 32.5 | 27 | 1900 | no bead |
| F4 | 7.6 | 0.025 | 18.6 | 40 | 1400 | no bead |
| F5 | 7.1 | 0.025 | 25.9 | 40 | 620 | no bead |
| F6 | 7.1 | 0.025 | 35.0 | 27 | 580 | no bead |
| B1 | 6.4 | 0.05 | 33.0 | 27 | 590 | 7350 |
| B2 | 6.7 | 0.025 | 23.1 | 40 | 320 | 6760 |
| B3 | 5.2 | 0.025 | 22.5 | 40 | 210 | 5880 |
| B4 | 4.0 | 0.05 | 25.4 | 45 | 180 | 3530 |
| B5 | 2.0 | 0.05 | 25.4 | 45 | 110 | 2650 |

PPFEMA films were deposited onto PCL mats in a custom-built 200 mm diameter reactor. The reactor was equipped with a stainless steel filament array, which was heated resistively to 250° C. to decompose the initiator thermally to form free radicals, and a water-cooled stage (35° C.) on which the substrate was placed. Pressure in the vacuum chamber was maintained at 0.3 torr. tert-Butyl peroxide (Aldrich) was used as the initiator and vaporized at room temperature. The PFEMA monomer (Aldrich) was vaporized in a glass jar that was heated to 90° C. The flow rates of peroxide and PFEMA were regulated using needle valves and kept constant at 0.1 and 0.8 sccm, respectively. For each deposition, a silicon wafer was placed close to the PCL mat as a reference for film growth and was monitored in-situ using an interferometry system equipped with a 632.8-nm HeNe laser source. Film thicknesses on the wafer substrates were measured using profilometry (Tencor P10) and ranged from 70 nm to 100 nm.

A Kratos Axis Ultra X-ray photoelectron spectrometer (XPS) (Kratos Analytical, Manchester) with a monochromatized Al Kα X-ray source was used to analyze the surface chemistry of the as-spun mats and coated mats.

The contact angles of water on the mats were measured using a Contact Angle Meter G10 (Kruss, Germany). The final result for each sample was obtained by averaging at least 4 separate runs. The threshold sliding angles were determined by first placing a 20 mg droplet gently on a level surface (Tilt stage, THORLABS) and then slowly tilting the surface until the droplet starts moving.

Oleophobicity of the PPFEMA-modified PCL mats was measured using AATCC (American Association of Textile Chemists and Colorists) test method 118-1997, in which the material is challenged with a series of test liquids, including n-decane, n-octane and n-heptane. AATCC test method 118-1997 scale (AATCC Technical Manual American Association of Textile Chemists and Colorists, Research Triangle Park, N.C., 1996). To test of repellency to oil (according to AATCC 118) droplets of standard test liquids, consisting of a selected series of hydrocarbons with varying surface tensions, are gently placed on the fabric surface. Contact angles are measured and recorded using a Contact Angle Meter. If there is no wetting (contact angle of about 0 degrees) or penetration after 30 seconds of exposure, the next test liquid of reduced surface tension is applied until clear wetting is achieved. The value obtained is the oil repellency value. Oil repellency values are as follows: 1=paraffin oil (also called Kaydol oil); 2=65 parts paraffin oil/35 parts n-hexadecane; 3=n-hexadecane; 4=n-tetradecane, 5=n-dodecane; 6=n-decane; 7=n-octane; and 8=n-heptane.

For example, when three different hydrocarbons (n-decane, n-octane and n-heptane) were applied to the e-spun/iCVD fabrics. No wetting or penetration was observed within 30 seconds after placing the droplet for all the three alkanes. Therefore at least Grade-8 oleophobicity is achieved. Note that the droplet size was about 10 mg to about 20 mg.

INCORPORATION BY REFERENCE

All of the U.S. patents and U.S. published patent applications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A coated surface, comprising a surface and a continuous conformal polymer coating, wherein said polymer coating was prepared from a mixture comprising a plurality of monomers represented by formula II:

II

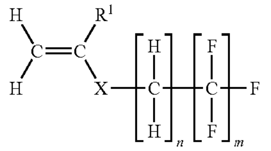

wherein, independently for each occurrence,

R is -hydrogen, -halogen, -alkyl, -cycloalkyl, -heterocycloalkyl, -alkenyl, -cycloalkenyl, -heterocycloalkenyl, -alkynyl, -cyano, -aryl or -heteroaryl;

$R^1$ is alkyl;

X is —O—, —N(R)—, —C(=O)O—, —C(=O)N(R)—, —C(=O)—, —C(=NR)—,

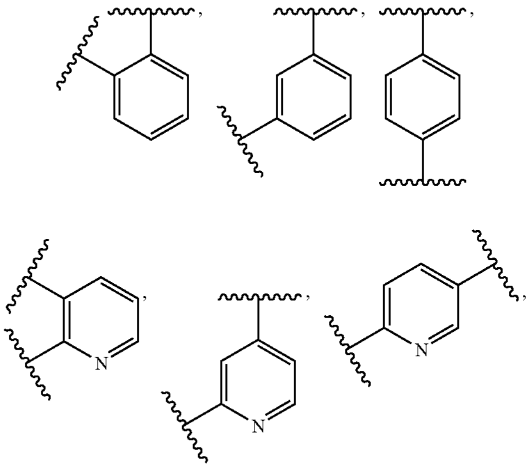

or

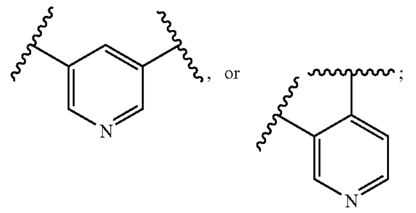

n is 0 to 10 inclusive; and m is 5 to 15 inclusive;

said coated surface is a fiber mat comprising a plurality of polymer-coated fibers;

said polymer-coated fibers comprises a polyhydroxyalkanoate;

said polymer-coated fibers are polymer-coated electrospun fibers; and said fiber mat exhibits a water contact angle of above about 150 degrees.

2. A coated surface, comprising a surface and a continuous conformal polymer coating, wherein said polymer coating was prepared from a mixture comprising a plurality of monomers represented by formula III:

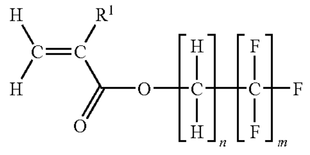

III wherein, independently for each occurrence, $R^1$ is alkyl;

n is 0 to 5 inclusive; and m is 5 to 10 inclusive;

said coated surface is a fiber mat comprising a plurality of polymer-coated fibers;

said polymer-coated fibers comprises a polyhydroxyalkanoate;

said polymer-coated fibers are polymer-coated electrospun fibers; and said fiber mat exhibits a water contact angle of above about 150 degrees.

3. The coated surface of claim 2, wherein $R^1$ is methyl.

4. The coated surface of claim 2, wherein n is 2.

5. The coated surface of claim 2, wherein m is 7.

6. The coated surface of claim 2, wherein $R^1$ is methyl; n is 2; and m is 7.

7. The coated surface of claim 2, wherein said polymer coating has a thickness in the range of about 70 nm to about 100 nm.

8. The coated surface of claim 2, wherein said fiber mat exhibits an oleophobicity of at least Grade-8.

9. The coated surface of claim 2, wherein said fiber mat exhibits a sliding angle of less than about 12 degrees.

10. The coated surface of claim 2, wherein said polymer-coated fibers comprise a polyglycolic acid, polycaprolactone, polyhydroxybutyrate, or polyhydroxyvalerate.

11. The coated surface of claim 2, wherein said polymer-coated fibers consists essentially of poly(caprolactone).

* * * * *